H. HORT.
MEASURING DEVICE.
APPLICATION FILED FEB. 14, 1921.

1,438,827.

Patented Dec. 12, 1922.
2 SHEETS—SHEET 1.

Inventor
Hermann Hort
By Knight Bros
Attys

Patented Dec. 12, 1922.

1,438,827

UNITED STATES PATENT OFFICE.

HERMANN HORT, OF ESSEN, GERMANY, ASSIGNOR TO FRIED. KRUPP AKTIENGESELLSCHAFT, OF ESSEN-ON-THE-RUHR, GERMANY.

MEASURING DEVICE.

Application filed February 14, 1921. Serial No. 444,898.

*To all whom it may concern:*

Be it known that I, Dr. HERMANN HORT, residing at Essen, Germany, a citizen of the German Republic, have invented a certain new and useful Improvement in Measuring Devices, of which the following is a specification.

This invention relates to a measuring device affording the possibility of accurately determining at any moment any alterations in the relative position of the axes of the bores of intercoupled gun barrels when being turned about their common trunnion axis. The invention will be further described with reference to the accompanying drawing which shows one embodiment of the subject matter of the invention by way of example.

Figure 1:
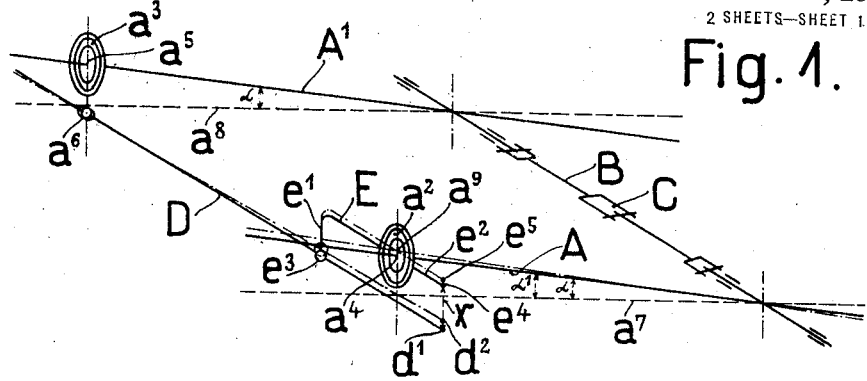
Fig. 1 is a diagram disclosing the measuring device along with the pertinent parts of two guns and serving to determine the deviations in elevation of the one axis of the bore relatively to the other.

Referring to these drawings and more particularly to Fig. 1, A and $A^1$ denote the axes of the bores of two gun barrels adapted to turn about a common trunnion axis B, the muzzles of said gun barrels being denoted by $a^2$ and $a^3$. C denotes a disconnectible coupling inserted in a shaft the axis of which is formed by the trunnion axis B. At the muzzles $a^2$ and $a^3$, the centres of which are indicated by $a^4$ and $a^5$, there are arranged two measuring rods D and E in the following manner: The rectangularly bent rod E is rigidly connected to the muzzle $a^2$ in such way that the limb $e^1$ of said rod E will assume a vertical position when the axis A assumes a horizontal position, while the free end $e^2$ of the rod E will assume a horizontal position at any elevation of the axis of the bore. The straight-lined measuring rod D is mounted on the one hand, rotatably and displaceably on a pivot $a^6$ vertically disposed underneath the centre $a^5$ of the muzzle $a^3$, and, on the other hand, rotatably but not displaceably, on a pivot $e^3$ for its part mounted on the limb $e^1$ of the rod E. The length of the limb $e^2$ is such that its extremity $e^4$ will be located vertically above the extremity $d^1$ of the measuring rod D when the axis of the bore A is in a horizontal position. As a result of this arrangement and the connection established between the measuring rods D and E, the relative distance $x$ prevailing between the points $e^4$ and $d^1$ will remain constant whenever the two intercoupled axes A and $A^1$ are rotated out of their horizontal position indicated by the straight lines $a^7$ and $a^8$ about any desired but mutually equal angles $\alpha$. If, on the contrary, one of the said axes, say, for example, A, happens to be rotated owing to a defect of the coupling C, about an angle differing from $\alpha$, say, an angle $\alpha^1$, so that the centre $a^4$ of the gun muzzle will assume the position indicated by $a^9$, then the points $d^1$ and $e^4$ will assume the position marked by $d^2$ and $e^5$ in which, as will be readily seen, the distance $d^2 e^5$ differs from the distance $d^1 e^4$ and is smaller than this latter. This variation of distance is therefore adapted to form a measure of the change that has taken place in the relative position of the centres $a^4$ and $a^5$ of the gun muzzles.

Figure 2:
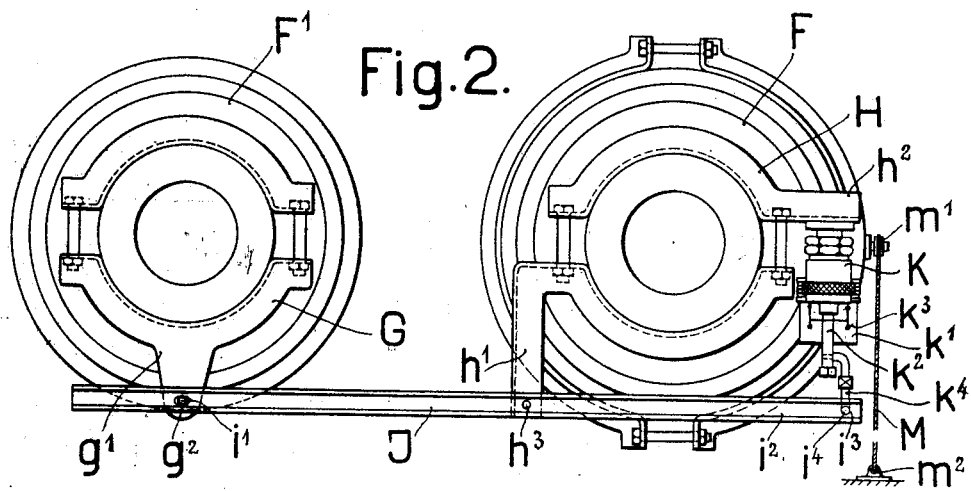
Fig. 2 is a front elevation of a construction embodying the diagram of Fig. 1.
Figure 3:
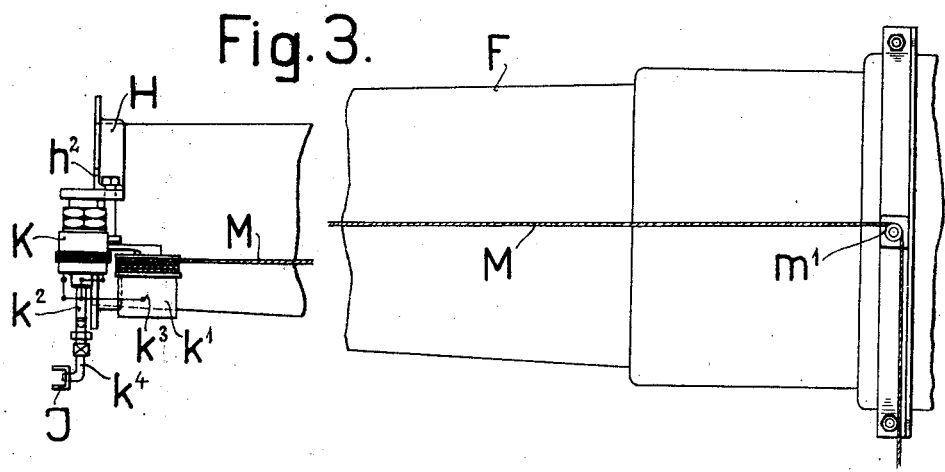
Fig. 3 is a side elevation of Fig. 2 looking from the right.
Figure 4:
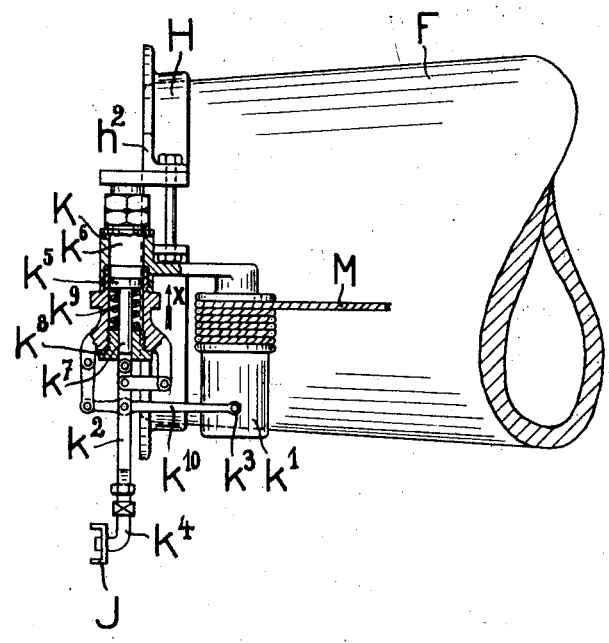
Fig. 4 is a fragmentary side elevation, partly in section, showing in detail the recording mechanism.

In the form of construction embodying the afore-explained idea and disclosed in Figs. 2 and 3, the gun barrels F and $F^1$ are adapted to turn about horizontal trunnions (not shown) the axes of which coincide and intermediate which there is inserted a disconnectible coupling (also not shown). On the respective ends of the guns there are rigidly fixed clamps G and H, respectively, of which the one, G, is provided with a depending extension $g^1$, and the other, H, with an arm $h^1$ extending straight vertically when the axis of the bore is in a horizontal position, and with another arm $h^2$ extending horizontally at any elevation of the gun barrel. The extension $g^1$ and the arm $h^1$ are provided with pivots $g^2$ and $h^3$ which assume a horizontal position when the axes of the bores assume likewise a horizontal position. The pivots $g^2$ and $h^3$ support a measuring rod J, the arrangement devised being such that the said measuring rod is capable of executing a rotation about the pivot $h^3$ while at the same time adapted to turn relatively to the pivot $g^2$ and to be displaced within the limits of a longitudinal slot $i^1$. Furthermore the measuring rod J is provided with an extension $i^2$ projecting beyond the pivot $h^3$ and at the extremity of which there is fixed by means of a hole $i^3$ a point $i^4$ corresponding to the point denoted by $d^1$ in Fig. 1. In addition, there is rigidly fixed to the free end of the arm $h^2$ a recording mechanism K. This recording mechanism is adapted to record the movements of the point $i^4$ relatively to a point participating in the elevation of the gun barrel F. The essential parts of this recording mechanism comprise a revoluble recording drum $k^1$, a displaceable rod $k^2$, and a driving mechanism for the recording drum $k^1$ consisting of a cord M. To one end of the rod $k^2$ is pivoted a piston $k^5$, which is guided in a cylindrical bore $k^6$, and the rod $k^7$ of which passes through the nut $k^8$, closing the bore $k^6$, see particularly Fig. 4. Between the piston $k^5$ and the nut $k^8$ is placed a spring $k^9$, which tends to move the piston $k^5$ in the direction of the arrow $x$ (Fig. 4). The other end of the rod $k^2$ is connected at $i^3$ (Fig. 2), by a connecting piece $k^4$, to the scale bar J. Finally, a lever $k^{10}$ is pivotally connected with the rod $k^2$ and has one of its ends pivoted to the stationary part of the recording mechanism and its other end carries the marking point $k^3$, standing in contact with the recording drum $k^1$. The cord M of the drum $k^1$ is led over a guide roller $m^1$, located in the vicinity of one of the shield pins, to a fixed point $m^2$ (Fig. 2) in the chamber. The axis of rotation of the recording drum $k^1$ as well as the rod $k^2$ extends in a vertical direction when the axis of the bore of the gun barrel F assumes a horizontal position.

In the aforesaid arrangement of the recording device K, the values measured on the surface of the recording drum $k^1$ in the direction of an (horizontal) axis of the abscissæ represents the angles of elevation of the intercoupled gun barrels, while the ordinates measured in the direction of a vertical axis represent the changes in the position of the centres of the two gun muzzles relatively to each other.

The manner of operation of the hereinbefore described measuring device is as follows:

The coupling (not shown) having been thrown out, the axes of the bores of the gun barrels F and F¹ are first of all separately shifted into the horizontal position by means of the elevating gear. Hereupon, the two barrels are intercoupled and by drawing the cord M a horizontal zero line is drawn on the surface of the recording drum $k^1$. This having been done, the two gun barrels F and F¹ are swung by means of the elevating gear first to the point of maximum elevation and then back into the horizontal position. During this elevating operation of the gun barrels the recording drum $k^1$ executes a rotation in the one direction and, during the lowering operation it makes a similar movement in the opposite direction. If the elevation of the two gun barrels is uniform, the marking point $k^3$ will remain on the zero line on the surface of the drum $k^1$; but when the elevation of one gun barrel varies from that of the other a curve will be marked on the surface of the drum, the ordinates of which curve, measured perpendicularly to the zero line, represent the changes in the position of the centres of the two gun muzzles relatively to each other, compare what has been said in connection with Fig. 1.

As will be readily understood, the measuring device constructed and arranged in accordance with the invention may also be employed to determine lateral deviations of the one axis of the bore relatively to the other. In this case, the recording mechanism would have to be fixed to the left-hand gun barrel of Fig. 2 in such a manner that the displaceable rod $k^2$ will be disposed horizontally, whereupon said rod would have to be connected to the measuring rod J.

Claims.

1. A measuring device for determining variations in the relative position of the axes of the bores of intercoupled gun barrels comprising a measuring element, means connecting said element with one gun barrel so as to be capable of rotation, means connecting said element with the other gun barrel so as to be capable of rotation and displacement, a recording mechanism and means connecting said measuring element to said recording mechanism whereby the distance of a point of said measuring element from a fixed point arranged on one of the gun barrels, will be measured.

2. A measuring device for determining variations in the relative position of the axes of intercoupled gun barrels comprising a measuring element, means connecting said element to one of said gun barrels so as to be capable of rotation, means connecting said element to the other of said gun barrels so as to be capable of rotation and displacement, a recording mechanism, said measuring element being connected to said recording mechanism whereby there are recorded the variations in the relative position of the axes of the bores of said gun barrels for all elevations in a rectangular system of co-ordinates.

The foregoing specification signed at Essen, Germany, this 2nd day of November, 1920.

DR. HERMANN HORT.

In presence of—
HANS GOTTSMANN,
JOHANN DECKERS.